United States Patent [19]
Okazaki et al.

[11] Patent Number: 5,730,349
[45] Date of Patent: Mar. 24, 1998

[54] TAPE GUIDE MECHANISM HAVING VIBRATION MECHANISM

[75] Inventors: Masaru Okazaki; Masahide Hasegawa; Keiichi Fukuzawa, all of Kanagawa-ken, Japan

[73] Assignee: Canon Kabushiki Kaisha, Tokyo, Japan

[21] Appl. No.: 537,251

[22] Filed: Sep. 29, 1995

[30] Foreign Application Priority Data

| Oct. 4, 1994 | [JP] | Japan | 6-240285 |
| Oct. 14, 1994 | [JP] | Japan | 6-249786 |
| Oct. 28, 1994 | [JP] | Japan | 6-265190 |

[51] Int. Cl.⁶ .................... B65H 20/00; B65H 23/04
[52] U.S. Cl. .................... 226/178; 226/194; 226/196; 242/907
[58] Field of Search .................... 226/168, 174, 226/178, 194, 196; 242/907

[56] References Cited

U.S. PATENT DOCUMENTS

| 4,593,956 | 6/1986 | Caruso et al. | 384/1 |
| 4,938,404 | 7/1990 | Helms et al. | 226/10 |
| 5,152,444 | 10/1992 | Saito | 226/196 |
| 5,224,643 | 7/1993 | Kojima et al. | 242/907 |
| 5,263,625 | 11/1993 | Saito | 242/907 |
| 5,295,618 | 3/1994 | Saito | 226/196 |
| 5,301,864 | 4/1994 | Saito et al. | 226/196 |
| 5,377,893 | 1/1995 | Saito | 226/196 |

*Primary Examiner*—Daniel P. Stodola
*Assistant Examiner*—Matthew A. Kaness
*Attorney, Agent, or Firm*—Robin, Blecker & Daley

[57] ABSTRACT

A tape guide mechanism includes a shaft having one end fixed to a base, a guide part provided in a predetermined position on the shaft to guide a tape, and a vibrating element capable of vibrating the shaft either in a first vibration mode or in a second vibration mode. In the first vibration mode, the tape is caused to travel at a predetermined normal speed. In the second vibration mode, the tape is caused to travel at a higher speed than the predetermined normal speed.

22 Claims, 12 Drawing Sheets

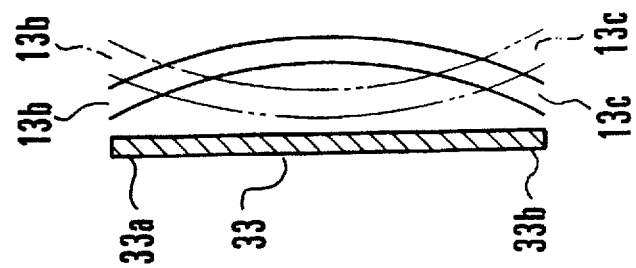
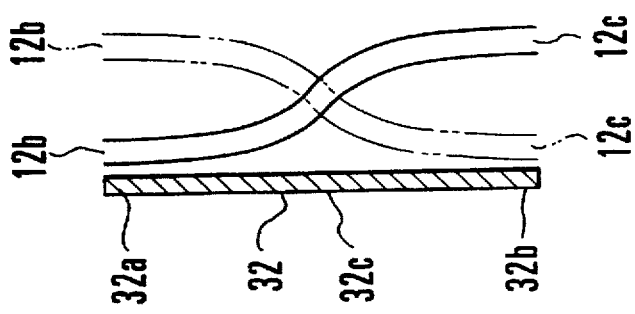
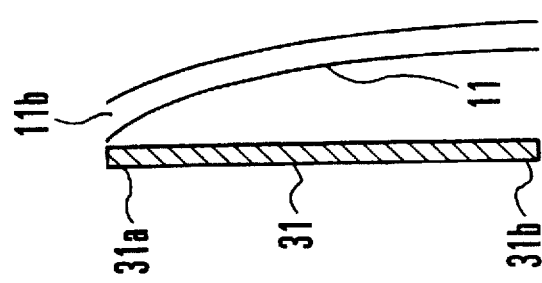

TAPE GUIDE MECHANISM HAVING VIBRATION MECHANISM

BACKGROUND OF THE INVENTION

1. Field of the Invention

This invention relates to a tape guide mechanism arranged, for example, to guide a tape-shaped recording medium used for a recording and/or reproducing apparatus.

2. Description of the Related Art

Tape guides used for magnetic recording and/or reproducing apparatuses of the kind using magnetic tapes may be roughly divided into two types. One is called a fixed type and the other a rotary type. The fixed type guide has a merit in that the tape can be stably guided. However, a demerit of this type resides in that the tension of the tape increases due to friction between the tape and the tape guide and thus makes it necessary to avoid as much as possible a large tape wrapping angle. Another demerit resides in that the coefficient of friction obtained between the tape and the tape guide when the tape is in repose becomes different from when the tape travels. The fixed type is therefore disadvantageous with respect to the stabilization of the tape tension. The rotary type guide, on the other hand, has a merit in that the rate of increase in tape tension is small. The rotary type, however, has a demerit in that its tape guiding action becomes unstable due to deflection of roller rotation and slipping taking place in the direction of the width of the tape.

Meanwhile, the recording density of magnetic recording and/or reproducing apparatuses has increased very much. As a result, the tape-shaped recording media have come to be arranged to have a smoother surface, to be thinner and to travel more stably at a higher degree of precision. Thus, the recording capacity of the tape-shaped recording media also has increased. The increase in recording capacity has resulted in a greater demand for improvement in operability with respect to searches and for a further increase in the speed of tape travel. It, therefore, has become necessary to increase the stableness of tape travel and that of tape tension. However, both the fixed type tape guide and the rotary type of tape guide are intrinsically incapable of readily meeting this need.

To meet this need, there have been developed various devices including one arranged to have a small hole in the surface of the fixed guide and to cause compressed air to spurt out from the small hole and another arranged to impart ultrasonic vibration to the surface of the fixed guide. These tape guides are capable of meeting the above-stated need. However, the one using compressed air is inevitably arranged in a large size as a unit as it necessitates the use of a compressor, piping, etc., and is not suitable for reduction in size of the device. The ultrasonic vibration imparting device, on the other hand, presents no problem with respect to reduction in size.

FIG. 1 shows by way of example the arrangement of the conventional tape guide of the kind using ultrasonic vibration. Referring to FIG. 1, a guide unit 110 is mounted on a base 120 by means of a shaft 111 and a screw 116. An upper flange 114, a pipe 112 and a lower flange 115 are secured to the shaft 111 by press fitting. A guide pipe 113 which is arranged to guide a tape 100 (see FIG. 3) by its outer circumferential surface is held by two projections 112a and 11b formed on the pipe 112. Further, in this case, a vibrator 101 is composed of a laminated type piezoelectric element and is arranged to expand and contract when a voltage is applied thereto. The vibrator 101 has one end of it secured to the surface of the guide pipe 113 by bonding and is held by a holding member 103 in such a way as not to come into contact with the tape 100.

When an AC voltage is applied to the vibrator 101, the guide pipe 113 is vibrated by the expansion and contraction of the vibrator 101. A resonant state which is as shown in FIGS. 2 and 3 can be obtained with the guide pipe 113 vibrated at an apposite frequency. In this resonance mode, there are two vibration nodes X and Y in the axial direction of the guide pipe 113 as shown in FIG. 2. In the radial direction of the guide pipe 113, as shown in FIG. 3, an elliptic shape having a major axis in the vertical direction and an elliptic shape having a major axis in the lateral direction are alternately and repeatedly obtained. Referring to FIG. 3, phases (a) and (i) have a maximum amplitude of vibration (loop) in phase. Phases (e) and (m) have a maximum amplitude of vibration (loop) in a negative phase relation to the phase (a). In the resonance mode, the outer circumferential surface of the guide pipe 113 is in a state as shown in FIG. 4, which shows the surface in a development view.

In the above-stated case, the two nodes X and Y in the axial direction are arranged to be in positions corresponding to the two projections 112a and 112b of the pipe 112. By virtue of this arrangement, the guide pipe 113 is held without any restriction on vibration, so that the efficiency of operation in the resonance mode can be enhanced. When the tape 100 is brought into contact with the guide pipe 113 while the guide pipe 113 is vibrating in this manner, the length of time during which the two are in contact with each other is substantially shortened to efficiently reduce friction between them, particularly when the tape is in repose.

However, because of the above-stated arrangement of generating a stationary wave at the contact part between the tape 100 and the guide pipe 113 and of supporting the guide pipe 113 on the shaft 111 at the nodes of vibration in the resonance mode, the conventional guide unit 110 has presented the following problems.

(i) In order to allow the resonant guide pipe 113 to move without restriction, it is necessary to have a mechanism arranged to support the guide pipe 113 at the positions of nodes of vibration in the resonance mode. However, a high degree of precision is required for machining and assembling in order to precisely set the positions of the nodes X and Y on the guide pipe 113. Besides, the guide pipe 113 itself must be prepared in predetermined dimensions and to have an apposite surface roughness. Such requirements thwart mass production.

(ii) The resonant state of the guide pipe 113 is determined by the length, diameter, thickness and material of the guide pipe 113. The tape guide can be arranged in a smaller size by decreasing the length and diameter of the guide pipe 113. This method, however, causes the resonance frequency to increase. The increased resonance frequency accelerates internal attenuation. To avoid the increase of the resonance frequency, the thickness of the guide pipe 113 must be decreased. In that case, the degree of machining precision must be further increased. That method thus not only causes an increase in cost but also degrades part handling efficiency.

Further, the length, diameter and thickness of the guide pipe 113 tend to be limited by the design of the mechanism. It is difficult in actuality to greatly change these parameters. As for the selection of the material of the guide pipe 113, its rigidity cannot be much changed. The conventional structural arrangement thus does not give much latitude in setting the resonance frequency. In other words, the possible reduction in size and cost is limited by the conventional arrangement.

(iii) The resonance mode which is provided for a friction mitigating effect is arranged to be brought about by means of the guide pipe 113 which has a high rigidity and is in a tubular shape. A large energy is necessary in bringing about a stationary wave of a predetermined amplitude with the ultrasonic vibration. The guide pipe 113 inevitably becomes expensive as it must be made of a material such as a ceramic material that has a high vibration efficiency with small internal attenuation.

(iv) A plurality of vibrating states which give the friction mitigating effect are obtained by forming the stationary wave at the guide pipe 113. However, since the guide pipe 113 is supported at a plurality of points which, in actuality, serve as nodes only for a single resonance mode and fail to become nodes for other resonance modes. It is, therefore, impossible to efficiently use the guide pipe 113 for every resonance mode. In other words, it is impossible to switch one of the plurality of resonance modes over to another according to the traveling condition of the tape.

(v) With the tape guided, the tape supportive-contacting part of the guide pipe 113 comes to be charged with static electricity. The static electricity causes ambient dust to stick to the tape supportive-contacting part. Such dust might become detrimental to a stable travel of the tape. To avoid such a trouble, the guide pipe 113 which is made of a special material must be arranged to be conductive. It is, therefore, necessary to use an expensive material such as a conductive ceramic material.

SUMMARY OF THE INVENTION

It is an object of this invention to provide a compact, low-cost vibrating tape guide mechanism which can be arranged, without using any highly vibrant material such as a ceramic material, to give a salient friction mitigating effect with a small energy by transmitting a vibrating energy to a tape supportive-contact member at a maximum efficiency.

It is another object of this invention to provide a vibrating tape guide mechanism which is arranged to permit a resonance frequency to be set with a great amount of latitude, without necessitating any high degree of precision for machining and assembly, by clearly separating vibrating tape guide parameters with the mass of a tape supportive-contact member taken into consideration.

It is a further object of this invention to provide a tape guide mechanism which is capable of giving a plurality of resonance modes arranged to give a friction mitigating effect through a single tape guide.

It is a further object of this invention to provide a tape guide mechanism which is arranged to permit selection of any of a plurality of vibration modes of a tape guide by which a friction mitigating effect is effectively attainable.

It is a still further object of this invention to provide a tape guide mechanism which is arranged to be capable of effectively avoiding any unstable state of tape travel by preventing dust from sticking to a tape supportive-contact part due to electrostatic charge.

To attain at least one of the above-stated objects, a tape guide mechanism arranged as an embodiment of this invention comprises: a shaft having one end fixed to a base; a guide part, provided in a predetermined position on the shaft, for guiding a tape; and vibration means capable of vibrating the shaft in a first vibration mode and a second vibration mode, wherein, in the first vibration mode, the tape is caused to travel at a predetermined normal speed and, in the second vibration mode, the tape is caused to travel at a higher speed than the predetermined normal speed.

To attain these objects, a tape guide mechanism which is arranged as another embodiment of this invention comprises: a shaft having one end fixed to a base; a guide member for guiding a tape, the guide member being fixed to the shaft approximately at a barycentric position of the guide member, the position of the shaft at which the guide member is fixed being either a position where the shaft is displaced by vibration approximately to a maximum extent at about zero angle of displacement or a position where the shaft is displaced by vibration approximately to zero extent at about a maximum angle of displacement; and vibration means for vibrating the shaft.

Further, to attain these objects, a tape guide mechanism arranged as a further embodiment of this invention comprises: a shaft having one end fixed to a base, the shaft being composed of two parts which differ in rigidity; a guide part, provided in a predetermined position on the shaft, for guiding a tape; and vibration means for vibrating the shaft.

The above and other object and features of this invention will become apparent from the following detailed description of preferred embodiments thereof taken in connection with the accompanying drawings.

BRIEF DESCRIPTION OF THE DRAWINGS

FIGS. 7(A), 7(B) and 7(C) schematically show the relation of a tape to a tape supportive-contact part of the embodiment shown in FIG. 5.

DETAILED DESCRIPTION OF THE PREFERRED EMBODIMENTS

A tape guide mechanism arranged according to this invention as an embodiment thereof is described in outline below with reference to FIGS. 5, 6 and 7.

Figure 1:
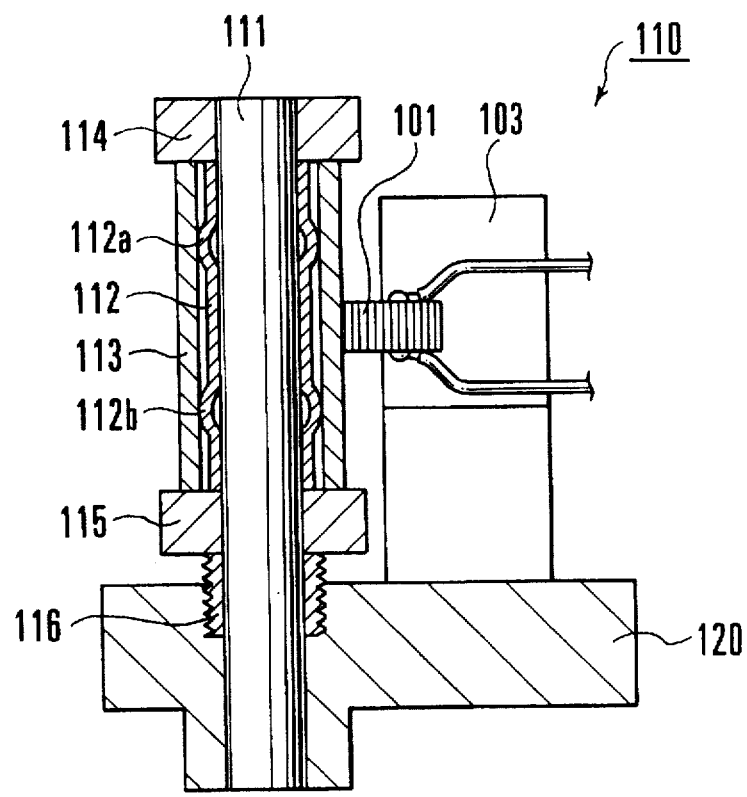
FIG. 1 is a sectional view of the arrangement of the conventional vibrating tape guide mechanism.
Figure 2:
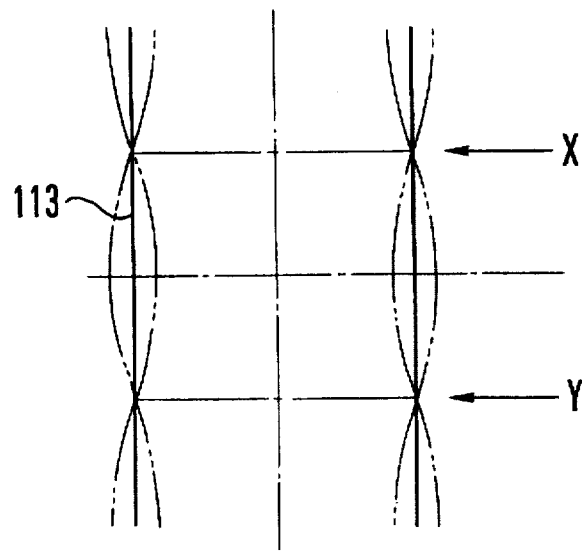
FIG. 2 shows a resonance mode of the conventional vibrating tape guide mechanism.
Figure 3:
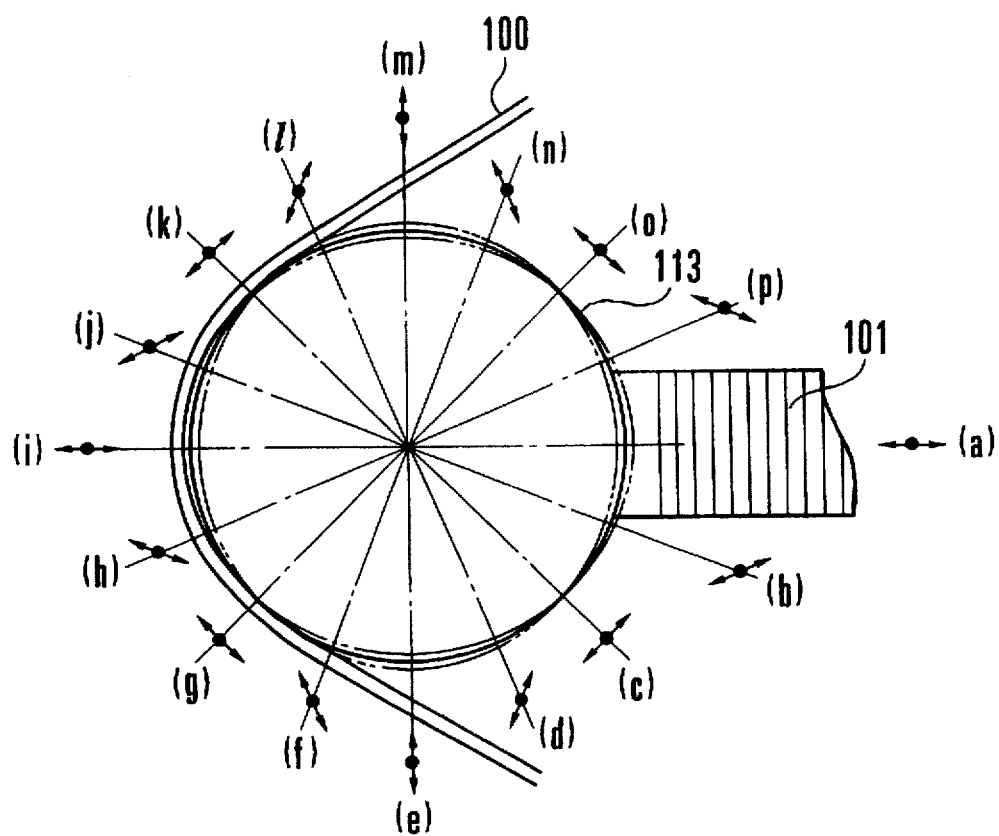
FIG. 3 is a plan view showing by way of example a part of the conventional vibrating tape guide mechanism as in the resonance mode.
Figure 4:
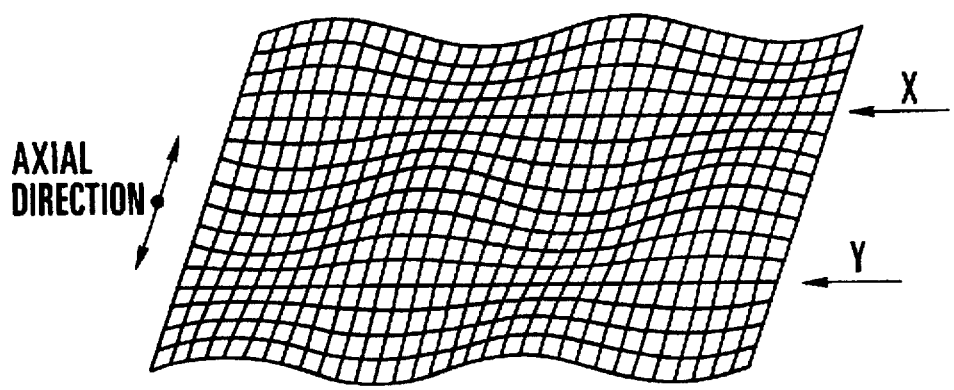
FIG. 4 is a development view showing the surface of a guide pipe in a state obtained when the conventional vibrating tape guide is in the resonance mode.
Figure 5:
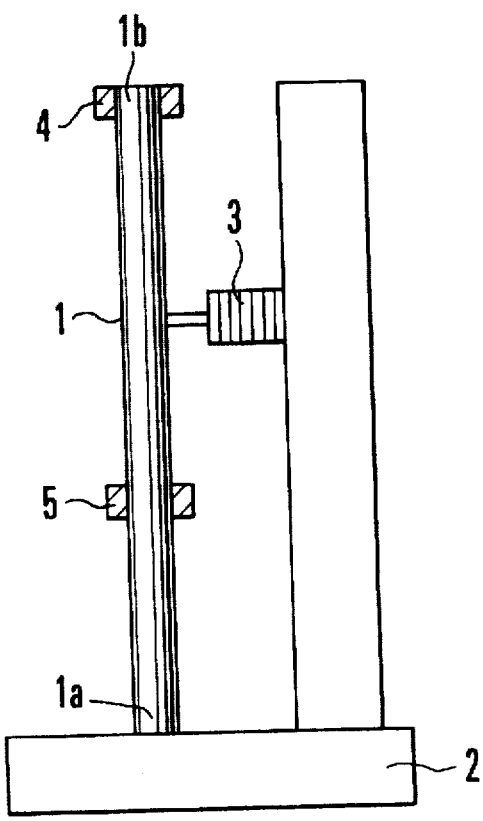
FIG. 5 is a schematic view showing a tape guide mechanism arranged as an embodiment of this invention.

FIG. 5 schematically shows the tape guide of this embodiment. The tape guide is formed in a compact unit including a shaft 1 which is made of a conductive material and which has one end 1a fixed to a base 2 and a free end 1b, and a vibrator 3. The vibrator 3 is composed of a laminated type piezoelectric element and is orthogonally fixed to the shaft 1 in such a way as not to come into contact with the tape. The vibrator 3 is arranged to vibrate the shaft 1 by making expanding and contracting motions when an AC voltage is applied thereto. The shaft 1 is provided with flanges 4 and 5 which are arranged at the free end 1b and below the free end 1b to restrict the vertical deviation of the position of the tape.

The operating principle of the tape guide mechanism which is arranged as described above is next described with reference to FIGS. 6 and 7 as follows.

Figure 6:
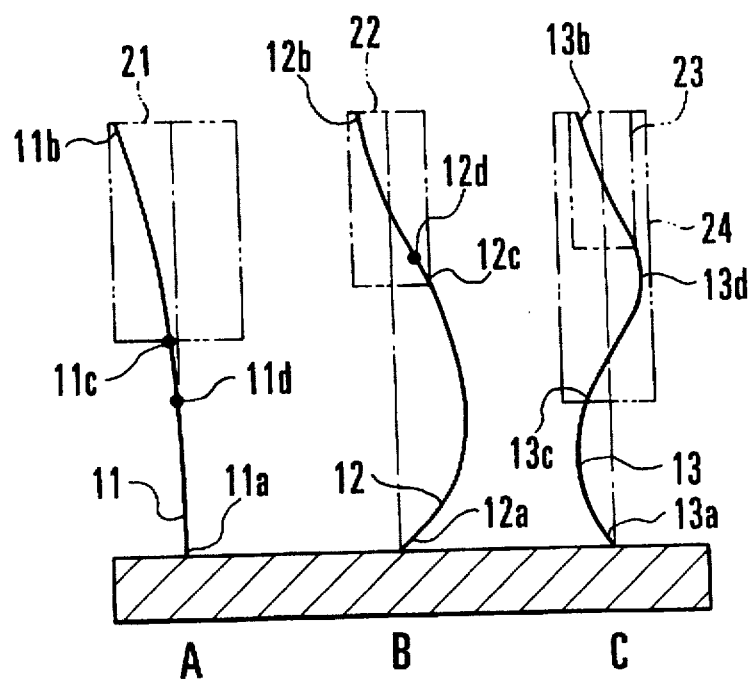
FIG. 6 schematically shows the embodiment shown in FIG. 5 in a vibrating mode.

When the shaft 1 is vibrated by the vibrator 3 at an apposite frequency outside of an audio-frequency band, the shaft 1 resonantly vibrates in one of vibration modes A, B and C as shown in FIG. 6. In FIG. 6, the movements of the shaft 1 obtained in the vibration modes A, B and C are respectively indicated by reference numerals 11, 12 and 13. Tape supportive-contact parts which effectively contribute to a friction mitigating effect are indicated respectively by numerals 21, 22, 23 and 24. FIGS. 7(A), 7(B) and 7(C) respectively show supportive-contact states obtained between the shaft 1 and the tape when the tape supportive-contact parts 21, 22, 23 and 24 come into contact respectively with tapes 31, 32 and 33.

In the vibration mode A, as shown in FIG. 6, a resonant state in which the amplitude increases accordingly as a vibrating part is nearer to the free end 11b with the fixed end 11a of the shaft 11 acting as a node of the vibration. In this case, with the tape supportive-contact part 21 caused to come into supportive contact with the tape, the contact area per unit time between the two can be reduced. Besides, the friction between the two also can be lessened as the tape buoys up.

However, in the resonant state of the vibration mode A, as shown in FIG. 7(A), a large force is applied to an edge part 31a on one side (in the direction of width) of the tape 31 corresponding to the free end 11b of the shaft 11, while no force is applied to an edge part 31b on the opposite side of the tape 31. In other words, the tape supportive-contact part 21 fails to uniformly exert a force on the tape 31. As a result, the edge part 31a of the tape 31 corresponding to the free end 11b of the shaft 11 comes to expand. Besides, the barycentric position of the tape guide then greatly varies to seriously affect some of peripheral equipments.

In the vibration mode B, a resonant state is obtained with two points, i.e., a fixed end 12a of the shaft 12 and a point located nearer to the free end 12b than the middle part of the shaft 12, acting as nodes of vibration. When the tape supportive-contact part 22 is caused to come into supportive contact with the tape, the shaft parts 12b and 12c of the shaft 12 corresponding to the two ends of the tape supportive-contact part 22 in the direction of width of the tape alternately come into contact with the tape. Then, with a position in which the amplitudes of the shaft parts 12b and 12c become equal to each other selected, the shaft parts 12b and 12c at the tape supportive-contact part 22 are allowed to alternately come into contact with the tape edge parts 32a and 32b in a symmetric manner with respect to a center position 32c in the direction of width of the tape 32, as shown in FIG. 7(B). In this case, since the amplitudes of the shaft parts 12b and 12c are equal to each other, a force is equally exerted on the two edge parts 32a and 32b of the tape 32 to effectively prevent the tape 32 from expanding on one side. Besides, the amount of fluctuations of the barycentric position of the tape guide also can be greatly suppressed.

Further, since the shaft parts 12b and 12c in the tape supportive-contact part 22 are arranged to alternately come into contact with the tape edge parts, the contact area between the shaft 12 and the tape 32 substantially decreases in the vibration mode B. An air layer formed between the two then causes the tape 32 to buoy up, so that friction can be effectively mitigated to prevent the tape 32 from being damaged.

In the resonant state obtained in the vibration mode C, three points, i.e., a fixed end 13a of the shaft 13, a point located nearer to the free end 13b than the middle part of the shaft 13 and a point located nearer to the fixed end 12a than the middle part, act as nodes of vibration. In a case where the tape supportive-contact part 24 is allowed to come into supportive contact with the tape, the shaft parts 13b, 13c and 13d of the shaft 13 corresponding to the two end parts and the middle part of the tape supportive-contact part 24 in the direction of width of the tape come into contact with the tape one after another. In this case also, the contact area between the shaft 13 and the tape 33 substantially decreases, so that the friction between them can be effectively mitigated.

Further, with a position where the amplitudes of the shaft parts 13b and 13c become equal to each other selected, a force is exerted equally to two edge parts 33a and 33b of the tape 33. Therefore, the tape 33 is effectively prevented from expanding on one side, and fluctuations of the barycentric position of the tape guide can be greatly suppressed.

In a case where the tape supportive-contact part 23 is allowed to come into supportive contact with the tape in the vibration mode C, the tape guide operates substantially in the same manner as the vibration mode B.

As described above, in order to attain a friction mitigating effect without damaging the tape, the tape guide is preferably operated in the vibration mode B or in the vibration mode C, in which a force is equally applied to two edge parts of the tape and fluctuations of the barycentric position of the tape guide are small. The two vibration modes B and C are compared as follows. With the axial lengths of the shafts 12 and 13 assumed to be equal to each other, the vibration mode B readily gives a larger amplitude and thus more readily gives the friction mitigating effect by causing the tape to buoy up. On the other hand, with the tape supportive-contact part 24 allowed to come into supportive contact with the tape in the vibration mode C, the two come into contact also in the middle part of the tape, so that the length of the tape path varies to a less extent to ensure a steadier travel of the tape.

The friction between the shaft 1 (the shaft 11, 12 or 13) and the tape generates some electric charge. However, as mentioned above, the shaft 1 is made of a conductive material. Therefore, the problem of static electricity can be completely solved by grounding the shaft 1 to effectively let the electric charge escape.

A tape guide mechanism which is arranged as a second embodiment of this invention is described below with reference to FIGS. 8 and 9. The description uses the same reference numerals as those used in the foregoing description for all the parts of the second embodiment that are similar to those of the first embodiment.

Figure 8:
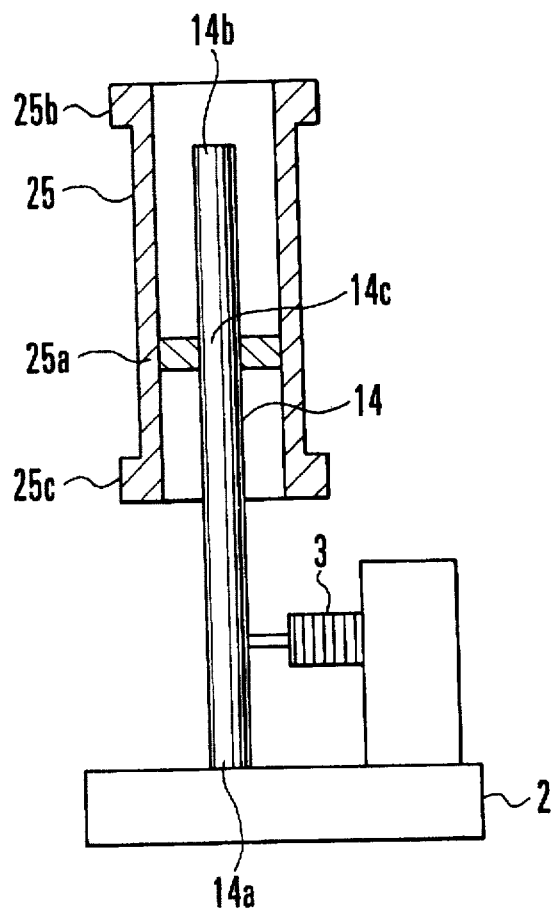
FIG. 8 is a schematic view showing a tape guide mechanism of a second embodiment of this invention.
Figure 9:
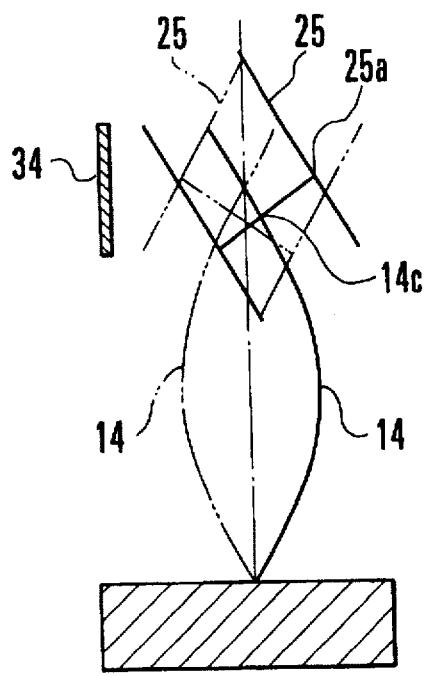
FIG. 9 schematically shows the second embodiment in a vibrating mode.

Referring to FIGS. 8 and 9, in the tape guide of the second embodiment, a shaft 14 has one end 14a fixed to a base 2 and the other end 14b arranged to be a free end. A tape supportive-contact member 25 is fixed to the shaft 14, as shown in FIG. 8. The tape supportive-contact member 25 is preferably made of a light-weight material in a tubular shape and is supported at its part 25a by the shaft 14 on a predetermined part 14c of the shaft 14. Both the shaft 14 and the tape supportive-contact member 25 are made of conductive materials and arranged to let any static electricity generated by frictional contact between the tape and the tape supportive-contact member 25 escape to the ground.

The tape supportive-contact member 25 is provided with flanges 25b and 25c which are arranged to restrain the tape from moving in the direction of width. With the tape supportive-contact member 25 made of a light-weight material as mentioned above, the vibration modes of the shaft 14 which are as shown in FIG. 6 are not affected too much by the weight of the supportive-contact member 25.

A vibrator 3 is composed of a laminated-type piezoelectric element, like in the case of the first embodiment, and is arranged to vibrate the shaft 14 with an AC voltage applied to the vibrator 3. When the shaft 14 is vibrated by the vibrator 3 at some suitable frequency outside of an audio-frequency band, the shaft 14 makes resonant vibration in the vibration mode B of FIG. 6.

Referring to FIG. 6, in the vibration mode B in particular, the tape support-contact member 25 is supported on the part 14c of the shaft 14, as shown in FIG. 8. With the tape supportive-contact member 25 supported in this manner, a resonance mode of the tape guide unit including the tape supportive-contact member 25 can be obtained as shown in FIG. 9.

In this resonance mode, the shaft 14 warps to deform as shown in FIG. 9. The tape supportive-contact member 25 changes its position according to or following the displacement of the part 14c of the shaft 14 which supports the tape supportive-contact member 25. In other words, the tape supportive-contact member 25 vibrates while keeping its posture in parallel to the part 14c of the shaft 14, as shown in FIG. 9. With the tape 34 allowed to be in contact with the tape supportive-contact member 25 in this mode, two end parts of the tape supportive-contact member 25 in the direction of width of the tape 34 alternately come into contact with the tape 34, so that a friction mitigating effect can be attained in the same manner as mentioned in the foregoing.

Further, in the second embodiment, the tape supportive-contact member 25 is arranged to rotatively vibrate on the barycenter of the tape guide unit. The amount of change taking place in the barycenter of the tape guide unit at the time of vibration is, therefore, small as a whole. The vibration of the tape guide unit thus can be effectively prevented from being transmitted to other parts disposed around the tape guide.

Figure 10:
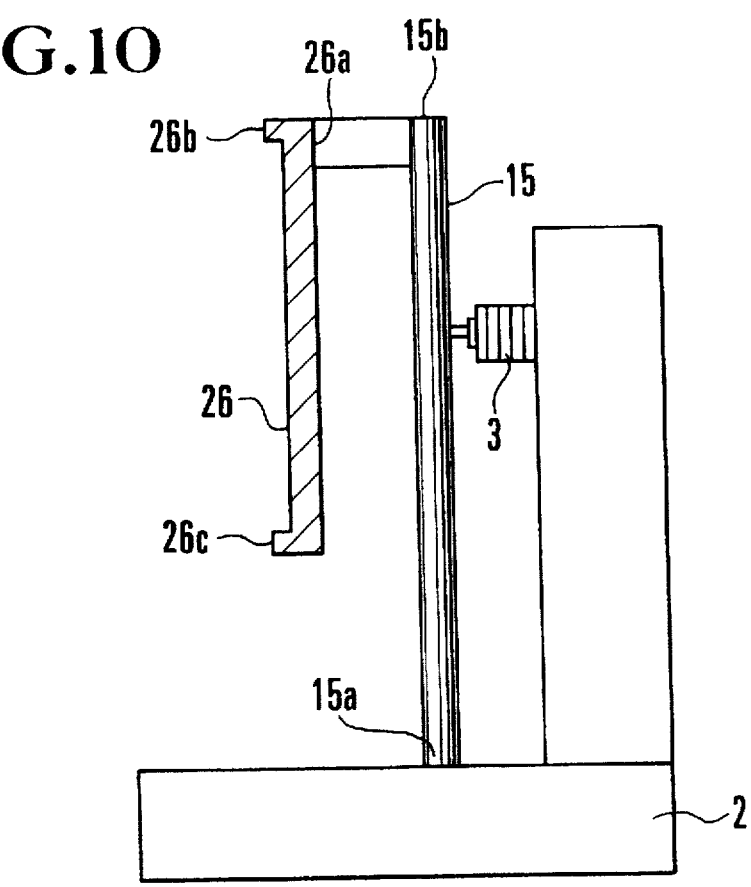
FIG. 10 is a schematic view showing a tape guide mechanism of a third embodiment of this invention.
Figure 11:
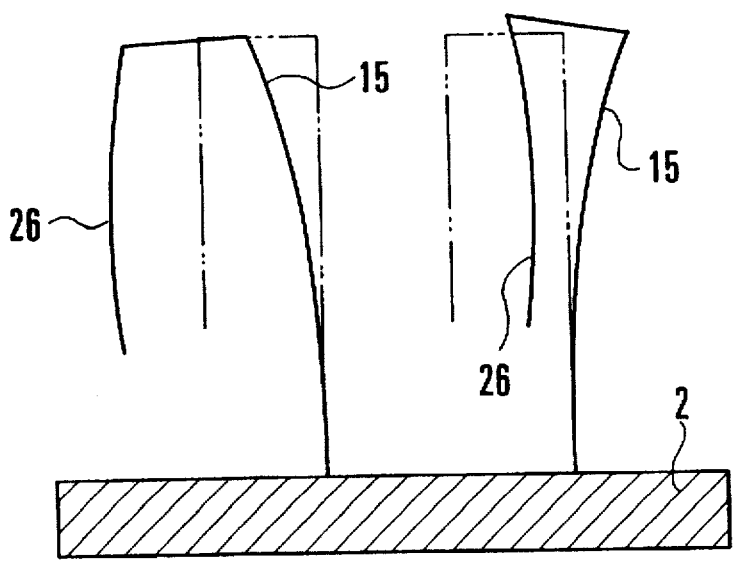
FIG. 11 schematically shows the third embodiment in a vibrating mode.

A tape guide mechanism which is arranged as a third embodiment of this invention is described below in outline with reference to FIGS. 10 and 11.

In the third embodiment, a tape supportive-contact member 26 which is made of a conductive material is fixed to a shaft 15 of a tape guide unit. The tape supportive-contact member 26 is formed in a shape which slightly curves toward the moving direction of the tape and is supported at its upper end part 26a by the free end part 15b of the shaft 15. Flanges 26b and 26c are provided at the upper and lower end parts of the tape supportive-contact member 26 to restrain the tape from moving in the direction of width.

The shaft 15 is arranged to be vibrated by applying an AC voltage to a vibrator 3. In this case, when the shaft 15 is vibrated at an apposite frequency outside of an audio-frequency band, there takes place a resonant state as shown in FIG. 11. This resonant state is similar to the vibration mode A shown in FIG. 6. In the vibration mode A, the resonant state of the third embodiment corresponds to a model obtained by bending the shaft 11 by 90 degrees respectively at its parts 11c and 11d. Therefore, the tape supportive-contact member 26 can be brought into supportive contact with the tape in such a way as to push the whole tape almost uniformly in the direction of width of the tape by balancing it according to the axial length of the shaft 11.

Further, since this embodiment is arranged as a model obtained by bending the shaft as mentioned above, a vibrating tape guide can be compactly arranged to have a shorter total length.

In the embodiment, as described above, the shaft is arranged to have one end fixed and to be brought into a resonance mode by the vibrator. The tape supportive-contact member is brought into supportive contact with the tape in a symmetric state with respect to the center of the width of the tape so that the tape can be efficiently caused to buoy up. Therefore, resistance to tape travel can be lessened to a great degree. The tape guide thus obviates the necessity of use of an expensive material excelling in vibration efficiency such as a conductive ceramic material. The embodiment, therefore, permits substantial reduction in cost.

It is necessary to use some material that excels in vibration efficiency in a case where a high vibration efficiency is required. However, since the tape guide of the embodiment described is simply arranged to include the shaft and the vibrator, the requirement can be easily met by using for the shaft a material of a good vibration efficiency and by simply machining it at a much lower cost than the conventional tape guide which requires machining on a tubular shape with a high degree of precision.

Further, since the resonance frequency is set outside of an audio-frequency band according to the arrangement of the embodiment described, no disagreeable sound is emitted to the outside of the tape guide unit, so that the apparatus which incorporates the tape guide unit can be comfortably operated.

The embodiment is arranged to have the tape supportive-contact member fixedly attached to the shaft in such a way as to directly reflect fluctuations or displacement taking place in a predetermined part of the shaft while the shaft is vibrating. The arrangement obviates the necessity of using a special material for the tape supportive-contact member, so that the material for this member can be selected from among such materials that can be easily machined in obtaining a predetermined surface roughness. Further, the rigidity of the shaft can be easily varied and adjusted through the thickness and the length of the shaft. Therefore, the embodiment gives a greater latitude in selecting a resonance frequency and also permits reduction in size. Further, with the tape supportive-contact member fixedly attached to the shaft, the tape is effectively prevented from suddenly changing its traveling direction, so that the possibility of damaging the tape can be minimized.

Further, since the tape supportive-contact member, etc., are formed with conductive materials, any electric charge that is caused by the frictional contact at the tape supportive-contact part is readily removed. Therefore, the embodiment prevents dust from sticking to the tape and the tape from sticking to the tape guide, so that the tape can be stably transported.

Next, a more practical example of a tape guide mechanism embodying this invention is described in detail below with reference to FIG. 12 to FIG. 16(A) to 16(D).

Figure 12:
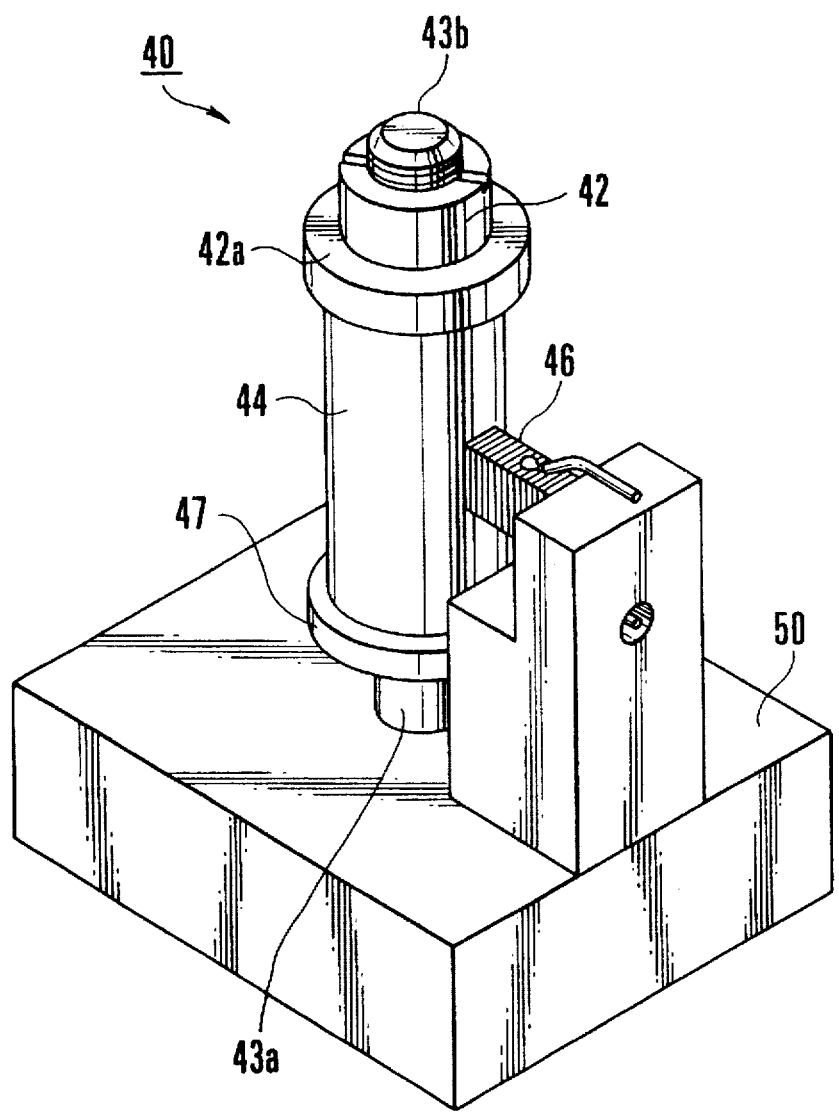
FIG. 12 shows in an oblique view the appearance of the tape guide mechanism of the third embodiment.
Figure 13:
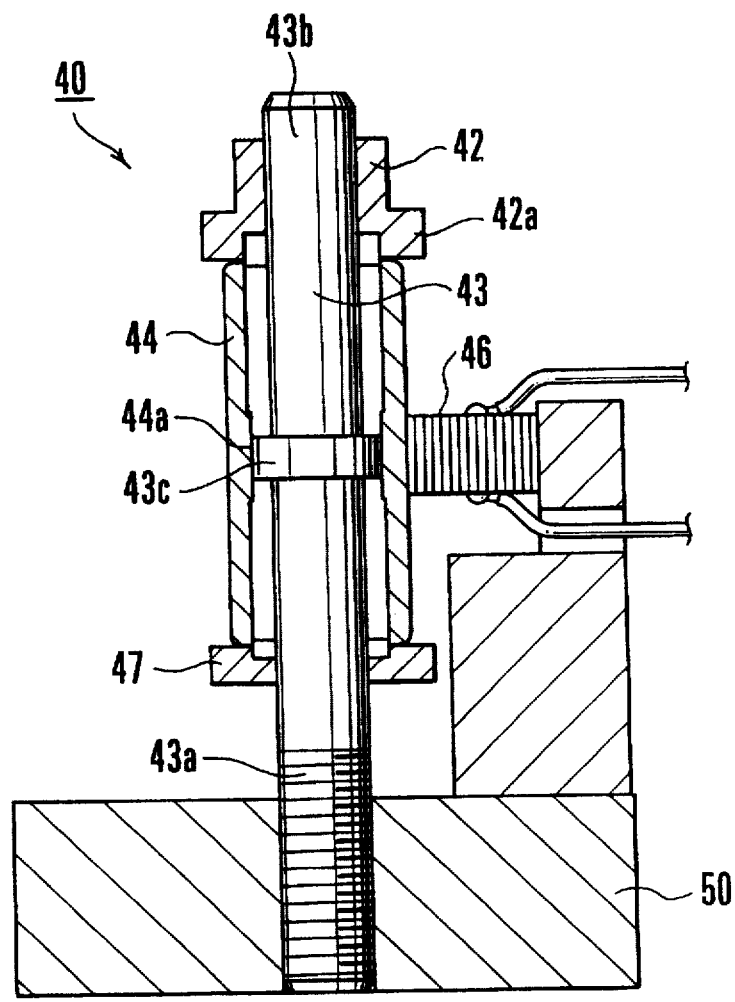
FIG. 13 is a sectional view showing the tape guide mechanism of the embodiment shown in FIG. 12.

FIGS. 12 and 13 are appearance and sectional views of the tape guide mechanism arranged according to this invention. In this case, a tape guide unit 40 is composed of a support shaft 43 which has its one end 43a fixed to a base 50 and the other end 43b in a free state carrying a mass system 42, and a tape supportive-contact member 44 which is in a tubular shape. In addition to these parts, a vibrator 46 is orthogonally secured to the tape supportive-contact member 44 in such a way as not to come into contact with the tape.

The vibrator 46 is composed of a laminated type piezoelectric element. Referring to FIG. 13, flange parts 42a and 47 are arranged to restrain the position of the tape from deviating in the vertical direction. The flange part 47 is made of a light-weight material to avoid any adverse effect on the vibration mode of the tape guide which will be described later. The support shaft 43 and the tape supportive-contact member 44 are made of conductive materials for the purpose of allowing electric charge generated at the tape supportive-contact member 44 to readily disappear.

Figure 16A:
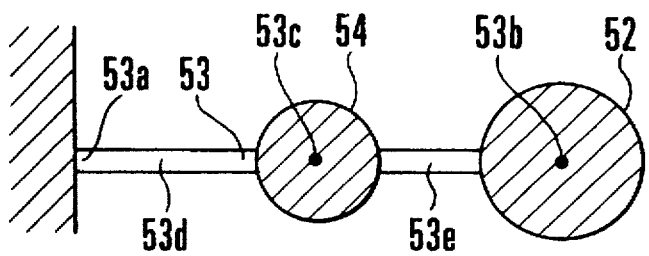
FIGS. 16(A), 16(B), 16(C) and 16(D) show by way of example the modelling of the embodiment shown in FIG. 12 and modes of resonance of the model of the embodiment.

The tape supportive-contact member 44 is supported at a position determined by a barycentric position 44a of the tape supportive-contact member 44 and a position 43c where the deforming vibration of the support shaft 43 shows a maximum displacement or a maximum distortion angle. The position 43c corresponds to a position 53c where the maximum amplitude of second-order vibration (see FIG. 16(C)) having nodes at a fixed end and near to a free end is obtained in a cantilever (beam) model which has two mass systems and will be described later with reference to FIGS. 16(A) to 16(D). The tape supportive-contact member 44 is fixed to the support shaft 43 at such support position 43c. Assuming that the above-stated beam model is in a third-order vibration mode in which the beam warps in an S-like shape as shown in FIG. 16(D), the support position 43c coincides with a node set near a middle part in the longitudinal direction of the support shaft 43.

Figure 14:
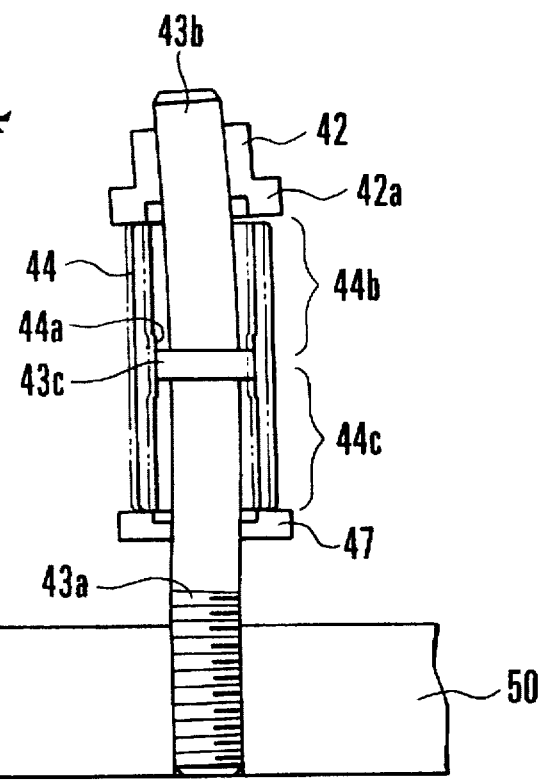
FIG. 14 shows the embodiment shown in FIG. 12 in a second-order resonance mode.

The support shaft 43 vibrates when an AC voltage is applied to the vibrator 46. With the vibration caused at an apposite frequency outside of an audio-frequency band, a resonant state can be obtained as shown in FIG. 14.

The principle of bringing about this resonant state is described with reference to FIGS. 16(A) to 16(D) as follows. The tape guide unit 40 is first approximately simulated with a simple dynamical model. The tape guide unit 40 can be modeled in the form of a cantilever as shown in FIG. 16(A). In other words, the tape guide unit 40 is represented by a beam model having two mass systems. In the beam model, a mass system 52 corresponds to the mass system 42 disposed on the free end side of the tape guide unit 40 of FIG. 12, and another mass system 54 corresponds to the tape supportive-contact member 44 of FIG. 12. A beam 53 corresponds to the support shaft 43 of FIG. 13. In the cantilever model having the beam 53 fixed at its fixed end part 53a, the mass systems 52 and 54 are supported respectively at a middle position 53c and a fore end position 53b of the beam 53.

The resonant state of the beam 53, in the model shown in FIG. 16(A), is assumed to be obtainable in three resonance modes of different degrees of vibration. These resonance modes are described as follows.

Figure 16B:
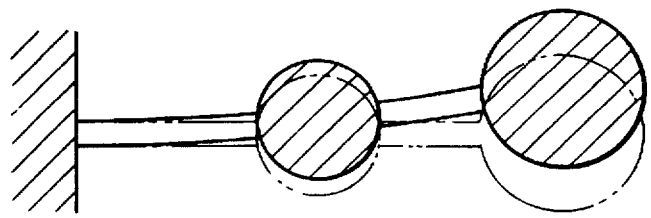

In a first-order resonance mode which is as shown in FIG. 16(B), a resonant state is obtained with the fixed end part 53a acting as a node of vibration. Due to the rigidity of the two mass systems 52 and 54 and that of the beam 53, the two mass systems 52 and 54 are in phase and the displacement of the model increases accordingly as its part is nearer to its free end.

Figure 16C:
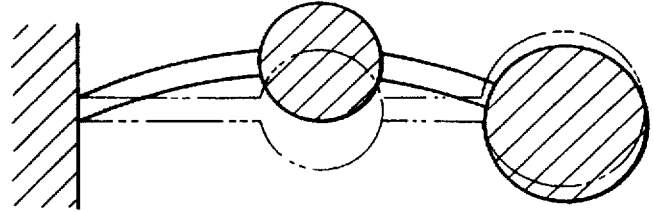
Figure 16D:
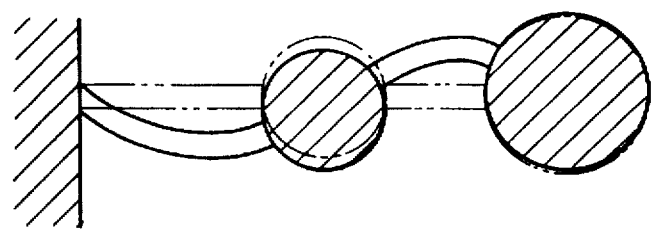

In a second-order resonance mode, the beam 53 is displaced to cause the beam parts 53d and 53e and the mass systems 52 and 54 to be in a negative phase sequence as shown in FIG. 16(C). The first mass system 54 is in a position which coincides with the maximum amplitude point of this mode of vibration. Therefore, in the second-order resonance mode, the fixed end part 53a and a part located near to the free end become nodes of the vibration.

In a third-order resonance mode, the beam 53 warps into an S-like shape as shown in FIG. 16(D) and the first mass system 54 is in a position which coincides with a node located near the middle part of the beam 53.

The vibrating state of the mass system 54 is determined by three parameters, i.e., the rigidity and length of the beam 53 and the mass of the mass system 52. Therefore, a position where a maximum amplitude is obtained in the second-order vibration mode and a position where a node is obtained at the middle part of the beam 53 in the third-order vibration mode can be made to coincide with each other, by setting the above-stated three parameters at predetermined values.

Further, with the mass systems 52 and 54 set in such a way as to have a smaller amplitude at the fore end part of the beam 53 (fore end position 53b) as shown in FIG. 16(C), the first mass system 54 at where the maximum amplitude of vibration is obtained is allowed to vibrate to a great extent.

Figure 15:
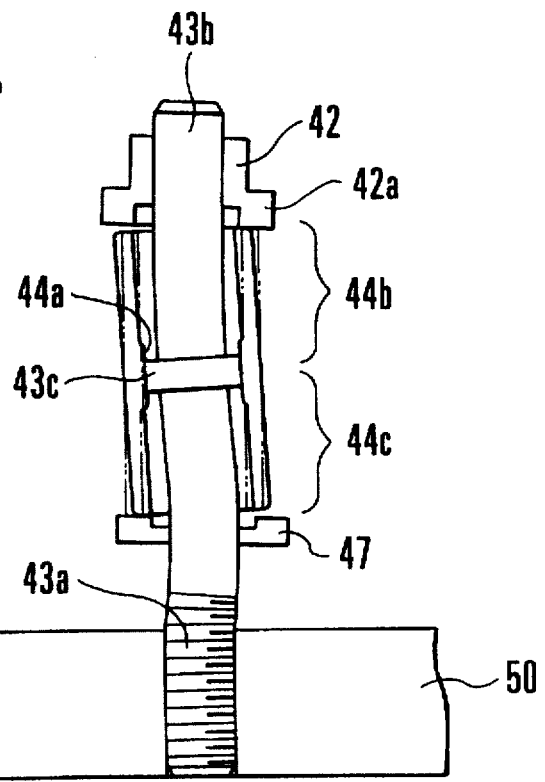
FIG. 15 shows the embodiment shown in FIG. 12 in a third-order resonance mode.

With the parameters set at apposite values in the tape guide unit designed in the above-stated manner, when the tape guide is vibrated at an apposite frequency, the tape guide can be brought into a resonant state as shown in FIG. 16(C) in which two ends 43a and 43b of the support shaft 43 shown in FIG. 14 act as nodes and the support position 43c for the tape supportive-contact member 44 acts to have a maximum amplitude of vibration. Or into a resonant state as shown in FIG. 16(D) in which the support shaft 43 warps into an S-like shape as shown in FIG. 15 and the support position 43c for the tape supportive-contact member 44 acts as a node of vibration.

In the second-order resonance mode which is as shown in FIG. 16(C), the tape supportive-contact member 44 is supported at a position of the support shaft 43 where a maximum amplitude of vibration is obtained. Therefore, following the maximum amplitude at the position 43c of the support shaft 43, the upper and lower parts 44b and 44c which are displaced in phase with the position 43c are vibrated in parallel (translating vibration) as shown in FIG. 14. In the third-order resonance mode which is as shown in FIG. 16(D), vibration takes place to displace the upper and lower parts 44b and 44c of the tape supportive-contact member 44 in the direction opposite to the support shaft 43, as shown in FIG. 15. Therefore, on the side of the tape, there is obtained a rotative vibration which brings about salient displacement at both edge parts of the tape in the direction of its width.

In the invented arrangement described above, the second-order or third-order resonance (vibration) mode is suited for obtaining the friction mitigating effect. A desired mode for the tape guide unit 40 can be readily selected from among the resonance modes described above by causing the vibrator 46 to apply a vibrating frequency at the applicable resonance frequency.

The features of the vibration modes mentioned above are as follows. In the first-order resonance mode which is as shown in FIG. 16(B), the barycentric position of the whole model is caused to shift. In the second-order resonance mode shown in FIG. 16(C), on the other hand, the amount of shift in the barycentric position of the whole model is smaller than in the first-order resonance mode as the two mass systems 52 and 54 are displaced in a negative phase sequence. The second-order resonance mode thus has an advantage in that the tape supportive-contact member 44 makes a translating motion with large amplitudes. In the third-order resonance mode which is as shown in FIG. 16(D), the support shaft 43 is displaced in an S-like shape. In this case, the barycentric position is not shifted as the barycentric part of the tape supportive-contact member 44 is supportive at a position where a node of vibration is obtained.

In the translating vibration of the tape supportive-contact member 44, as shown in FIGS. 14 and 16(C), the tape is pushed upward in the direction of its width with a uniform force by the vibration of the tape supportive-contact member 44. This force acts to buoy up the tape to give a salient friction mitigating effect by uniformly forming a layer of air extending in the direction of the tape width between the tape and the tape supportive-contact member 44.

In the case of the rotative vibration of the tape supportive-contact member 44 as shown in FIGS. 15 and 16(D), on the other hand, the tape and the tape supportive-contact member 44 come into contact with each other alternately at the edge parts in the direction of tape width. In this case, the vibration does not much vary in the middle part of the tape. Therefore, a tape path little varies in length, so that longitudinal vibration which is imparted from the tape supportive-contact member 44 by pulling the tape in the longitudinal direction of it and then by canceling the pulling action can be minimized. This mode of vibration is, therefore, advantageous in that the tape is allowed to stably travel.

Therefore, in cases where a tape-shaped recording medium is transported at a high speed, the tape guide unit is operated in the second-order resonance mode which gives a greater friction mitigating effect. In the case of a normal tape transporting speed, the third-order resonance mode is employed with importance attached to the stable travel of the tape. The best suited mode is thus can be selected from among the different tape guide vibrating modes according to the situation. Since the tape guide unit consists of only the support shaft 43 with the mass system 42 mounted on the side of the free end, the tape support-contactive member 44 and the vibrator 46, the tape guide mechanism can be easily machined and assembled. Despite of its compact size, the tape guide unit 40 thus obtained gives a great friction mitigating effect.

In the embodiment described, the barycentric part of the tape supportive-contact member is arranged to be supported at positions where the vibration of the shaft has a maximum amplitude or where a node of the vibration is obtained. By virtue of the arrangement, the vibration taking place at the maximum deforming part of the shaft can be used to efficiently cause the tape supportive-contact member to make resonant vibration and the vibrating energy is efficiently transmitted to the tape supportive-contact member.

The traveling resistance of the tape-shaped recording medium thus can be readily lessened. Therefore, the invented arrangement obviates the necessity of use of an expensive material of a high vibration efficiency such as a ceramic material. In a case where a better vibration efficiency is required, use of a material having a higher vibration efficiency may become necessary. Even in such a case, it suffices to use such a material of high vibration efficiency only for the shaft, because the vibration of the shaft is dominant in the case of the vibration mode of this embodiment. The invented arrangement thus facilitates machining work. Therefore, compared with the conventional arrangement which necessitates machining work on a tubular shape, the invented arrangement permits a great reduction in cost.

Further, since the embodiment described has the second mass system arranged on the side of the free end of the shaft, the shaft vibrating mode can be set by the position of the second mass system as well as the rigidity of the shaft. More specifically, the vibration balance of the tape supportive-contact member can be set by the tape-supportive-contact-member supporting position while the resonance frequency can be set by the length of the shaft. The second mass system, therefore, facilitates design work on the tape guide mechanism.

In the embodiment, the vibration balance of the tape supportive-contact member would slightly vary, for example, if the position at which the tape supportive-contact member is supported deviates. The resonance frequency also would slightly vary if the length of the shaft varies. Unlike the conventional arrangement, however, a slight deviation in respect of precision of the machining and assembly work never leads to any salient deviation in respect of vibrating efficiency. In other words, in accordance with the arrangement of the embodiment described, the friction mitigating effect is affected to a much less degree by deviation of machining and assembly precision than the conventional arrangement.

Further, while the conventional arrangement allows selection of a resonance frequency only within a narrow range, the invented arrangement described gives a much greater range of selectable resonance frequencies as the rigidity of the vibration system is variable to a great extent to vary the resonance frequency also to a great extent by changing the tape supportive-contact member and the second mass system and also by changing the thickness of the shaft.

Further, according to the arrangement of the embodiment described, positions where a maximum amplitude and a node or nodes of vibration are obtained are almost unvarying for any of different resonance frequencies. A plurality of vibration modes thus can be obtained by one and the same unit. This feature effectively permits common use of parts for different units.

The embodiment allows the tape-shaped recording medium to travel always in an optimum state by selectively varying the resonance mode of the vibrating tape guide according to operating conditions.

With the tape guide mechanism arranged according to this invention to operate using ultrasonic vibration, it might sometimes become impossible to obtain a desired resonance mode due to some error of machining work on the support shaft 43 and the mass system, the rigidity of the support shaft 43 or fluctuations in precision of assembly work. Further, at the time of assembly, the position of the tape guide unit 40 is finely adjusted in the vertical direction for stable tape transportation. The fine vertical adjustment might change the length of the shaft. This change sometimes makes it impossible to obtain a desired resonance mode. In such a case, it might become difficult to efficiently vibrate the tape guide and to expect the friction mitigating effect on the tape.

To solve the above-stated problem, another tape guide mechanism is explained according to this invention as an example of improvement on the embodiment described. This improvement is described with reference to FIGS. 17 and 18 as follows. The improvement has all the functions and advantageous features of the embodiment described in the foregoing. In the following, all the parts that are arranged and function in the same manner as in the embodiment described are indicated by the same reference numerals as those used in the foregoing.

Figure 17:
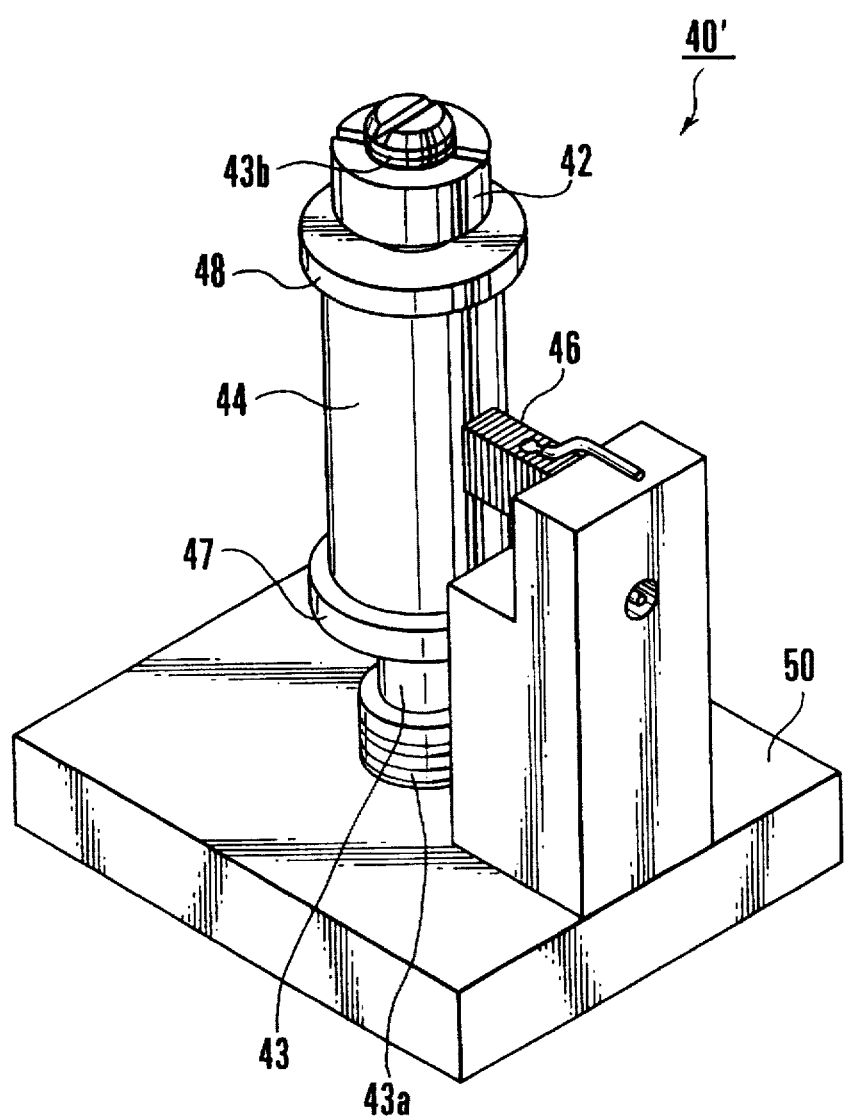
FIG. 17 shows in an oblique view the appearance of an improvement over the tape guide mechanism of the embodiment shown in FIG. 12.
Figure 18:
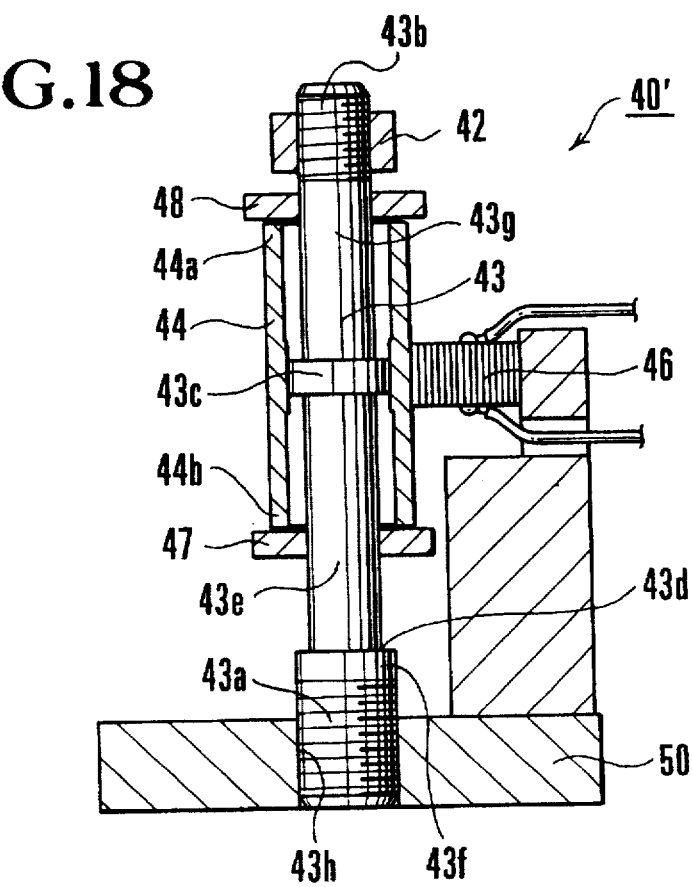
FIG. 18 is a sectional view showing the embodiment shown in FIG. 17.

FIG. 17 is an appearance view of the tape guide unit 40' representing the example of improvement mentioned above. FIG. 18 shows it in a sectional view. Referring to FIGS. 17 and 18, the tape guide unit 40' is composed of a support shaft 43 which has its one end 43a fixed to the base 20 and which has a mass system 42 at its free end 43b, and a guide pipe 44 which serves as the tape supportive-contact member. The guide pipe 44 is supported by a middle part 43c of the support shaft A vibrator 46 is fixed to the guide pipe 44 in a posture extending perpendicularly to the guide pipe 44 in such a way as not to come into contact with the tape. The vibrator 44 is composed of a laminated type piezoelectric element. Flange parts 47 and 48 are arranged to restrain the tape from moving in the vertical direction. The flange parts 47 and 48 are made of a light-weight material to prevent them from bringing about any adverse effect on the vibration mode of the tape guide.

Figure 19:
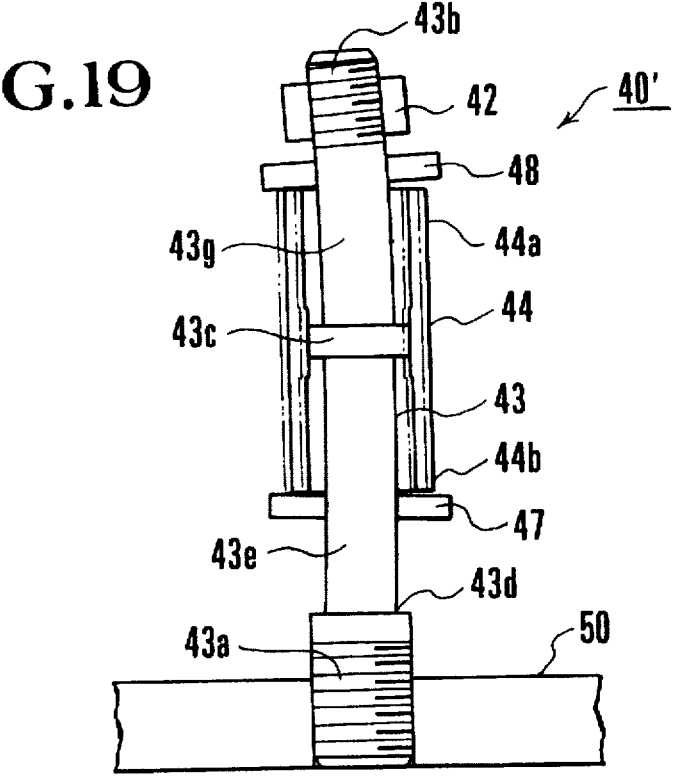
FIG. 19 shows by way of example a vibrating mode of the embodiment shown in FIG. 17.

The mass system 42 is screwed to the free end part 43b of the support shaft 43 in such a way as to permit vertical adjustment of the position at which the mass system 42 is supported. The support shaft 43 is in a two-stepped shape including a stepped part 43d, small diameter parts 43e and 43g and a large diameter part 43f. With the support shaft 43 thus arranged to have large and small diameter parts, the support shaft 43 has a larger rigidity at the large diameter part 43f than at the small diameter parts 43e and 43g. This arrangement makes it more difficult to vibrate the larger diameter part than to vibrate the small diameter parts, as shown in FIG. 19.

With the tape guide mechanism arranged in the above-stated manner, in adjusting the tape guide, the support shaft 43 of the tape guide unit 40' is first rotated to impart a restricting force to be exerted in the direction of tape width at the time of tape transportation adjustment. The support shaft 43 is then fixed at a screw part 43h by bonding in a suitable rotated position obtained by rotating the support shaft 43.

Next, an AC voltage is applied to the vibrator 46. Then, to obtain a desired resonance mode, the support position for the mass system 42 is vertically adjusted at the free end part 43b of the support shaft 43. After the adjustment, the mass system 42 is fixed to the support shaft 43 by bonding.

The length of the shaft changes when the position of the guide unit 40' is vertically adjusted. Even if the change taking place in the length of the shaft is of the order of millimeter, the vibration mode to be set is obtained mainly by the deformation of the small diameter parts 43e and 43g as the large diameter part which is in the fixed part of the two-stepped shape of the support shaft 43 has a higher rigidity. A shaft length which can participate in setting a resonance mode in the dynamical model of FIGS. 16(A) to 16(D), therefore, remains unchanged even in the second-order resonance mode of FIG. 16(C) and the third-order resonance mode of FIG. 16(D). Even if the setting parameter of the fixed part of the support shaft 43, i.e., the shaft length of the fixed part, is changed, the arrangement of the guide unit 40' greatly reduces the degree to which the change of the shaft length participates in setting the vibration mode of the tape supportive-contact part (member), so that the tape transportation adjustment can be easily and accurately carried out.

In cases where some fluctuations in machining precision are inevitable, on the other hand, a certain amount of tuning can be carried out by shifting the position of the mass system 52 on the side of the free end 53b in the dynamical model of FIG. 16(A) in such a way as to vary the bonding rigidity of the shaft supporting the mass systems 52 and 54. In a case where the beam 53 is to be vibrated, for example, to have a maximum amplitude at the mass system 54, a machining error or the like might cause the rigidity of a part 53e of the beam 53 on the side of its free end to become relatively smaller in the vibration mode in which the mass system 54 is set at a position nearer to the fixed end part 53a than the maximum amplitude position. In such a case, the rigidity of the beam part 53e can be increased by shifting the mass system 52 toward the fixed end part 53a. Therefore, the mass system 54 can be caused to vibrate at the position where the maximum amplitude of the beam 53 is obtained.

The tuning action performed in the dynamical model mentioned above is carried out for the tape guide unit 40' as follows. Referring to FIG. 19, if the free end part 43b of the support shaft 43 happens to be at a longer distance than a correct distance, the vibration is made to cause the upper part 44a of the guide pipe 44 (FIG. 18) to be displaced to a larger amount than the lower part 44b of the guide pipe 44. In this instance, the amounts of displacement of the upper and lower parts 44a and 44b can be equalized by shifting the position of the mass system 42 toward the fixed end to obtain a translating vibration. The adverse effect of the machining error thus can be substantially absorbed. If the free end part 43b of the support shaft 43 is at a distance shorter than a correct distance, the adverse effect of the machining error can be likewise substantially absorbed by shifting the mass system 42 toward the free end part 43b.

In the above case, the resonance mode of FIG. 16(C) in which the maximum amplitude of vibration of the support shaft 43 is obtained at a position for supporting the guide pipe 44 is taken up by way of example. However, the tuning action also can be carried out in the same manner in the case of the resonance mode shown in FIG. 16(D).

While this invention has been described with respect to what is presently considered to be preferred embodiments, it is to be understood that the invention is not limited to the disclosed embodiments. The invention is intended to cover various modifications and equivalent arrangements included within the spirit and scope of the appended claims. For example, the fixed part of the support shaft 43 may be arranged to have a thicker sectional shape by changing it into a multistep shape having a three or more steps or into a tapered shape. The same advantageous effects as those of the embodiments described can be attained by such modifications. Further, while the embodiment described is arranged to permit fine adjustment of the position of the mass system 42 provided at the free end part 43b of the support shaft 43 by a method of screwing and bonding, the method may be changed to fit the mass system 42 on the support shaft 43 and to fix it at a suitable position with a screw.

In the example of improvement described, the tape guide mechanism includes a shaft which is fixed at one end, a tape supportive-contact member which is fixed to a predetermined part of the shaft and a vibration means which is arranged to vibrate the shaft. In this tape guide mechanism, fluctuations of setting parameters taking place at the time of assembly and finishing errors taking place in machining can be effective absorbed or lessened by varying the rigidity of the shaft.

In the improvement example, the rigidity of the fixed part of the shaft is increased by arranging the fixed part to have a larger sectional shape so that, even in a case where the length of the shaft varies when the shaft is adjusted for tape transportation, the vibration mode of the tape supportive-contact member can be kept unvarying for attaining a high friction-mitigating effect as desired.

Further, since the improvement example is arranged to permit adjustment of the mass system supporting position on the side of the free end of the shaft, the vibration balance of the tape supportive-contact member can be finely adjusted. The machining errors, etc., thus can be effectively absorbed or lessened by virtue of the fine adjustment.

What is claimed is:

1. A tape guide mechanism comprising:
   a) a shaft having one end fixed to a base;
   b) a tape guide, provided in a predetermined position on said shaft, for guiding a tape; and
   c) means for directly vibrating said shaft in a first vibration mode and in a second vibration mode, wherein, in the first vibration mode, the tape is caused to travel at a predetermined normal speed and, in the second vibrational mode, the tape is caused to travel at a higher speed than the predetermined normal speed, said vibrating means being axially spaced from said tape guide.

2. A mechanism according to claim 1, wherein said means for vibrating is arranged to vibrate said shaft in such a way as to cause said shaft in the first vibration mode to have a third-order resonance mode or in such a way as to cause said shaft in the second vibration mode to have a second-order resonance mode.

3. A mechanism according to claim 1, wherein said guide is formed in a tubular shape.

4. A mechanism according to claim 3, wherein said guide is supported by said shaft approximately at a barycentric position of said guide.

5. A mechanism according to claim 1, wherein said shaft is made of a conductive material.

6. A mechanism according to claim 5, wherein said guide is made of a conductive material.

7. A tape guide mechanism comprising:
   a) a shaft having one end fixed to a base;
   b) means for directly vibrating said shaft; and
   c) a tape guide for guiding a tape, said guide being fixed to said shaft approximately at a barycentric position of said guide and axially spaced from said vibrating means, the position of said shaft at which said guide is fixed being one of at a position where said shaft is displaced by vibration approximately to a maximum vibration amplitude extent at about zero angle of displacement and at a position where said shaft is displaced by vibration approximately to zero vibration amplitude extent at about a maximum angle of displacement.

8. A mechanism according to claim 7, further comprising a member having a predetermined mass and disposed at a free end of said shaft.

9. A mechanism according to claim 8, wherein a position at which the displacement of said shaft cause by vibration at one resonance frequency reaches a maximum amount coincides with a position at which the displacement of said shaft caused by vibration at another resonance frequency of a plurality of resonance frequencies reaches a zero amount, and wherein said guide is fixed to said shaft at the coinciding position.

10. A mechanism according to claim 9, wherein said means for vibrating is arranged to vibrate said shaft selectively at the plurality of resonant frequencies.

11. A mechanism according to claim 7, wherein said shaft is composed of two parts which differ in rigidity.

12. A mechanism according to claim 11, wherein said shaft has a higher rigidity on the side of a fixed end thereof than on the side of a free end thereof.

13. A mechanism according to claim 7, wherein said shaft is made of a conductive material.

14. A mechanism according to claim 13, wherein said guide is made of a conductive material.

15. A tape guide mechanism comprising:
    a) a shaft having one end fixed to a base, said shaft being composed of two parts which differ in rigidity;
    b) a guide, provided in a predetermined position on said shaft, for guiding a tape; and
    c) means for directly vibrating said shaft, said vibrating means being axially spaced from said guide.

16. A mechanism according to claim 15, wherein said shaft has a higher rigidity on the side of a fixed end thereof than on the side of a free end thereof.

17. A mechanism according to claim 16, wherein said shaft has a larger cross-sectional shape on the side of the fixed end thereof than on the side of the free end thereof.

18. A mechanism according to claim 15, further comprising a member disposed on the side of a free end of said shaft and having a predetermined mass, and means for adjusting a position at which said member is supported.

19. A mechanism according to claim 15, wherein said shaft is made of a conductive material.

20. A mechanism according to claim 19, wherein said guide is made of a conductive material.

21. A tape guide mechanism comprising:
    a) a shaft having one end fixed to a base;
    b) means for directly vibrating said shaft; and
    c) a guide, provided in a predetermined position on said shaft and axially spaced from said vibrating means, for guiding a tape, said guide being vibrated derivately from vibration of said shaft.

22. A tape guide mechanism comprising:
    a) a shaft having one end fixed to a base;
    b) a vibrator; and
    c) a tape guide axially spaced from said vibrator, said shaft being disposed between said vibrator and said tape guide, such that upon vibration of said shaft by the vibrator, said shaft vibrates the tape guide.

* * * * *